Dec. 25, 1962  H. V. DAUGHERTY  3,070,136
SAFETY WIRING PLIER
Filed May 8, 1958

INVENTOR.
HARRY V. DAUGHERTY
BY
John H. Widdowson
ATTORNEY

United States Patent Office 3,070,136
Patented Dec. 25, 1962

1

3,070,136
SAFETY WIRING PLIER
Harry V. Daugherty, Wichita, Kans., assignor of one-third to Irvin C. Hartman, Wichita, Kans.
Filed May 8, 1958, Ser. No. 733,907
5 Claims. (Cl. 140—119)

This invention relates to tools. In a more specific aspect this invention relates to wiring and tools to be used in such, particularly safety wiring and a plier tool. In still a more specific aspect this invention relates to a plier tool for twisting the ends of safety wiring used to assure maintaining nuts on bolts, and the like, and specifically it pertains to a safety wiring plier which can be used in hard to get to places to twist the ends of safety wiring or the portions of such projecting from a safety wired nut.

It is old to assemble mechanical apparatus using bolts and nuts to secure together, parts and assemblies of the apparatus. Industrial production today because of economies and efficiency consists where it can of assembling the final structure in a so-called assembly line from the parts and assemblies made at a location remote from the final assembly. Naturally, the final parts and assemblies are provided in many cases for joining together with nuts and bolts. Structures and machines which move are subject to vibration, tending to give difficulty in use due to the loosening of the nuts and bolts assembling the parts or assemblies. Machines and structures can fail completely because of the nuts and bolts separating, or the bolts failing due to being loose. These hazards are particularly severe in aircraft, automobiles, etc. To prevent loosening of the nuts on the bolts by vibration and/or jarring, it is common practice to safety wire the parts and our assemblies. Holes are drilled through the periphery of the nuts, usually on opposite portions thereof, and a safety wire is threaded throughout the assembly from nut to nut, the wire passing through the holes therein. Sometimes the wire is twisted between nuts, and in other instances, the wire is passed through several nuts before being twisted. Of course, in constructing the machine or structure using safety wiring, particularly at final assembly, in many cases the nuts to be safety wired are located remotely from a point of convenient operation by the worker, for example, parts of the machine or structure might be in the way of a housing for the machine or some other parts might interfere. I have found that in actual work in many cases, it is a difficult job of hunt and peck with the safety wire to try to safety wire a nut or series of nuts back in the confines of a machine or structure and shielded or surrounded by parts and assemblies of the machine or structure. The new safety wiring plier of my invention is designed for reaching and using with, safety wires and remotely located nuts. It very advantageously performs its function at the point of the nut and safety wiring, the plier being operated at the opposite end from the jaws and conveniently outside the machine or structure. The new safety wiring plier of my invention is easy and economic to make, and efficient and reliable in use.

The new safety wiring plier of my invention has an elongated casing. A rod is slidably mounted in the casing. The plier has means therewith which urges this rod into an extended position, and means which limits the extension of the rod. A trigger is mounted on the casing of the plier. The trigger and rod are operatively connected by suitable means. The rod in its outer end portion has arms secured thereto, and these arms have means therewith to receive the wire or wires of the safety wiring to twist same. The new plier of my invention for safety wiring is operable to extend the rod and arms thereon to an expanded position with the trigger of the

2 plier in one position, and to retract the rod and arms with the trigger in another position.

It is an object of my invention to provide new tool means.

It is another object of my invention to provide a new tool which is preferably used in safety wiring.

Still another object of my invention is to provide a new safety wiring plier tool to twist safety wires which have been threaded through eyes in the nuts whereon it is used.

Yet another object of my invention is to provide a new safety wiring plier tool to be used to twist the wires of safety wiring in remote and protected locations which are hard to reach with the hands and common and usual pliers, such new wiring plier of my invention having a substantially elongated shank and with the jaws of the plier operable from the opposite end.

It is another object of my invention to provide a new safety wiring plier tool which is easy and economical to make, and reliable and efficient in use.

Other objects and advantages of the new safety wiring plier of my invention will become apparent to those skilled in the art upon reading this disclosure.

Drawings accompany and are a part of this disclosure. These drawings depict preferred specific embodiments of the new safety wiring plier of my invention, and it is to be understood that the drawings are not to unduly limit the scope of my invention.

Figure 1:
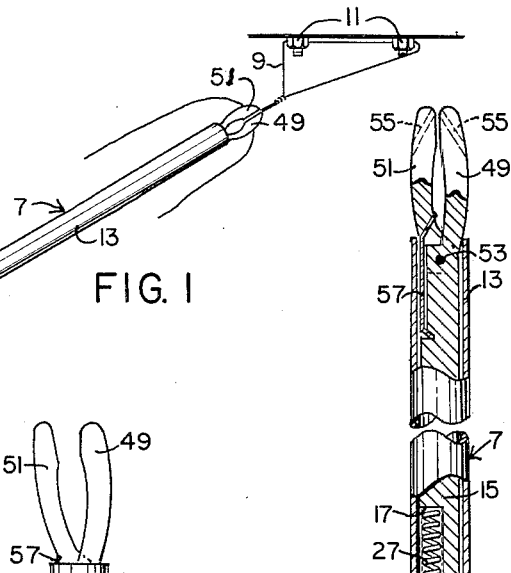
FIG. 1 is a perspective view of a preferred specific embodiment of the new safety wiring plier of my invention, and showing such in use position in relation to nuts and safety wiring therewith.

In the following is set forth a discussion and description of the new safety wiring plier of my invention made with reference to the drawings thereon the same reference numerals are used to indicate the same parts and/or structure. The discussion and description are of preferred specific embodiments of the new safety wiring plier of my invention, and it is to be understood that the discussion and description are not to unduly limit the scope of my invention.

In the drawings, plier 7 is shown mounted in operating position relative to safety wire 9 of the common and usual kind, such wire 9 being threaded through holes or eyes (not shown) in the periphery of nuts all which are of the usual and common kind.

The plier 7 has an outer substantially elongated tubular casing 13 which is preferably open at both ends. A substantially elongated operating rod 15 is slidably mounted in casing 13. This operating rod 15 is cut away in the rear portion to provide a longitudinal and elongated recess having a front end 17 a rear end 19, and a bottom 21. To the rear of the recess in the rod is formed a longitudinal slot 23 therethrough, the planes of the sides of which are transverse the plane of bottom 21 of the recess in rod 15. A pin 25 is mounted in the plier through the walls of casing 13, such pin 25 passing through the recess in rod 15. A helical spring 27 which acts in compression is mounted within casing 13 and recess in the rod 15. The forward end of spring 27 contacts the front end 17 of the recess, and the rear end of spring 27 rests against pin 25 rigidly secured in casing 13. The spring 27 in compression urges rod 15 forwardly into an extended position within casing 13. Also, the back end 19 of the recess in rod 15 rests against pin 25 to limit the travel of rod 15 into extended position.

Figure 2:
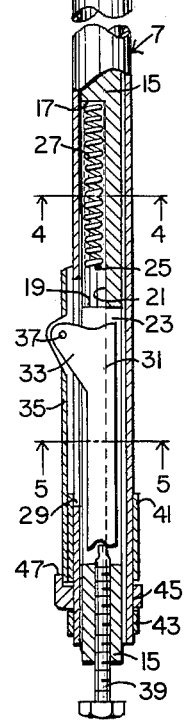
FIG. 2 is an enlarged longitudinal view partly cut away and partly in cross section of the tool shown in FIG. 1, the plier tool having the trigger thereof in closed position and with the jaws retracted and engaged.
Figure 3:
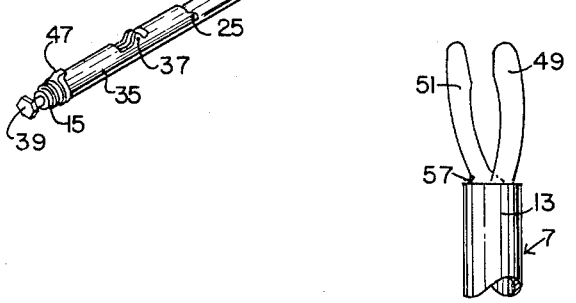
FIG. 3 is an enlarged longitudinal view partly cut away and partly in cross section showing the tool with the trigger in an open position and the jaws of the plier extended and expanded.
Figure 4:
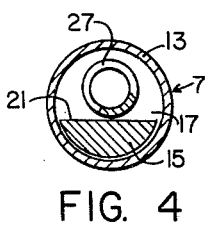
FIG. 4 is a view taken on line 4—4 of FIG. 2.
Figure 5:
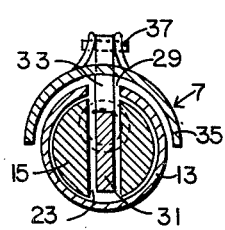
FIG. 5 is a view taken on line 5—5 of FIG. 2.

Casing 13 has a slot 29 in the rear portion thereof which communicates with the slot 23 in operating rod 15. An operating link and connecting member 31 is preferably movably mounted in slot 23 in operating rod 15. This link 31 has an arm portion 33 which projects out through slot 29 in casing 13. A trigger 35 preferably shaped to fit the contour of casing 13 is pivotably secured on casing 13 by pin 25. The trigger is preferably mounted to operate link and connecting member 31 by pin means 37 mounted in intermediate the ends of trigger 35 and through arm portion 33 of link 31. Thus, when trigger 35 is operated and pivoted about pin 25, link 31 moves within slot 23 of rod 15 and slot 29 of the casing 13. An open position of trigger 35 is shown in FIG. 3, and the closed position of trigger 35 is shown in FIGS. 2 and 5. In operation, link 31 moves rod 15 in relation to casing 13 by contacting adjusting screw 39 which is threadedly secured in the rear end of operating rod 15, such adjusting screw 39 projecting into slot 23 in the rod 15. The more adjusting screw 39 is turned into rod 15 to project into the slot 23, the farther operating rod 15 will slide upon retraction into casing 13 and operation of trigger 35.

I have found it desirable to employ latch means to hold trigger 35 in closed position (FIG. 2). Sleeves 41 and 43 are suitably secured to casing 13 to provide a circumferential groove wherein catch 45 is rotatably mounted. Catch 45 has a projecting portion 47 which overlaps trigger 35 to hold same in closed position (FIGS. 1 and 2). When latch 45 is turned 180 degrees from the position of FIGS. 1 and 2, the trigger is released for opening and forced into the open position of FIG. 3 by the force of spring 27. Sleeve 41 can also conveniently be used to position and retain link 31 in slot 23 of operating rod 15.

On the outer end of rod 15 there are operating arms 49 and 51. Arm 49 shown in the drawings is an integral part of rod 15, and arm 51 is of substantially the same shape as arm 49 but pivotably secured to rod 15 by pin means 53. These arms 49 and 51 form an expanding arm assembly, the expanded position being shown in FIG. 3 of the drawings. The outer end portions or jaws of arms 49 and 51 have eyes 55 formed therein preferably and substantially at the angle shown in FIG. 2 of the drawings. These eyes receive safety wiring 9 when using the plier. A leaf spring 57 is mounted in its inner end within casing 13 and a hole in operating rod 15, and it is mounted in its outer end in a recess in arm 51. This spring urges arm 51 to pivot outwardly to place the arms 49 and 51 in an expanded position (FIG. 3). When the rod 15 is retracted, the outer end of casing 13 contacts arms 49 and 51 to close same against the force of leaf spring 57.

The new safety wiring plier 7 of my invention is operable to extend operating rod 15 and place arms 49 and 51 into expanded position with trigger 35 in the released position, such occuring through the force of spring 27 and spring 57, and the plier 7 is operable to retract operating rod 15 and place arms 49 and 51 into closed position upon closing the trigger 35 into the position of FIGS. 2 and 5. Thus, the plier can be inserted through very small openings into the vicinity of remote safety wiring with the arms 49 and 51 closed. The plier 7 can be used to fish for and find ends of safety wiring, or the plier can be slipped through an opening with the wires in eyes 55 to the desired point of twisting the safety wiring 9. With the arms 49 and 51 at the point or in the vicinity of the desired place of twisting the safety wiring 9, the plier 7 is turned in the hands of the operator to form the twist in the wire. In practice the new safety wiring plier tool of my invention has proven very advantageous and much more rapid than the usual practice of installing the wiring by hand and feel in cramped quarters and through relatively small holes and openings, and the like.

As will be evident to those skilled in the art, various modifications of this invention can be made, or followed, in the light of this disclosure and discussion, without departing from the spirit or scope of this disclosure or from the scope of the claims.

I claim:

1. A safety-wiring plier comprising, in combination, an outer substantially elongated tubular casing open in its end portions, an inner substantially elongated operating rod slidably mounted in said casing and fixed therein to rotate therewith, said rod being cut away in the rear portion to provide therein a longitudinally elongated recess having ends and a bottom and having a longitudinally elongated slot in said rear portion to the rear of said recess the planes of the sides of which are transverse the plane of said bottom of said recess, a pin mounted through the walls of said casing and passing through said recess, a helical spring in compression mounted within said casing and recess and contacting said pin and operating rod at the forward end of said recess to urge said rod to extended position, said pin limiting extension of said rod, a slot in said casing communicating with said slot in said rod, an operating link member movably mounted in said slot in said rod and having an arm portion projecting through said slot in said casing, a trigger member shaped to fit said casing when pulled and pivotally secured to the rear end portion of said casing by said pin, said arm of said link pivoted to said trigger intermediate the ends thereof, an adjusting screw in the rear end portion of said rod and extending into said slot thereof, said screw contactable with said link to limit travel of and position said rod, a latch rotatably mounted on said casing to hold said trigger in pulled position, arms forming jaws on the outer end portion of said rod opposite from said trigger, one of said arms being pivotally mounted on said rod, said arm pivotally mounted on said rod being retractable to close said jaws upon retraction of said rod into said casing, said arms having eyes in the outer end portions to receive free ends of wires used in safety wiring, said wires when mounted in said eyes being twisted upon rotation of said casing and said rod together when said trigger is depressed, and a leaf spring mounted in said rod within said casing and said pivoted one of said arms, said spring urging said pivotally mounted arm into an expanded position, and said plier constructed and adapted so that said rod is extended and said arm expanded when said trigger is released, and said rod is retracted and said arm closed when said trigger is closed.

2. A safety-wiring plier comprising, in combination an outer elongated casing, an inner elongated operating rod slidably mounted in said casing and fixed therein to rotate therewith, a longitudinal recess in the rear portion of said rod and a longitudinal slot to the rear thereof, a spring in compression in said recess and contacting said rod and a fixed abutment in said casing to urge said rod to extended position, means within said casing to limit extension of said rod, a slot in said casing communicating with said slot in said rod, a link member movably mounted in said slot in said rod and having a portion projecting through said slot in said casing, a trigger pivotally secured to the rear end portion of said casing, and said portion of said link projecting through said slot pivoted to said trigger intermediate the ends thereof, adjusting means projecting into said slot in the rear end portion of said rod to form a movable abutment contactable with said link to limit travel of and position said rod, a pair of arms forming jaws on the outer end portion of said rod and having eyes to receive wiring in their outer end portions, said wiring when mounted in said eyes being twisted upon rotation of said casing a said rod in unison, one of said arms pivotally secured in the inner end portion to said outer end portion of said rod, said arms retractable in contact with said casing upon retraction of said rod to close said jaws, and spring means with said plier urging said arms into expanded position, and said plier constructed and adapted so that when said trigger is released said rod is extended and said arm expanded and when said trigger is closed said rod is retracted and said arms closed.

3. A safety-wiring plier comprising, in combination, an elongated casing, an elongated rod slidably mounted in said casing and fixed therein to rotate therewith, a longitudinal recess in the rear portion of said rod, resilient means mounted within said casing and recess in said rod contacting said rod and casing and urging said rod to extended position, means to limit the extension of said rod, a longitudinal slot in said casing communicating with a longitudinal slot in said rod, a link member movably mounted in said slot in said rod and contactable therewith to retract said rod and having a portion projecting through said slot in said casing, a trigger pivotally mounted on the rear end portion of said casing, said projecting portion of said link pivotally connected to said trigger intermediate the ends thereof, arms on the outer end portion of said rod and having eyes in the outer end portions to receive wiring said wiring when mounted in said eyes being twisted upon rotation of said casing and said rod in unison, said arms being mounted so as to be separated when extended from said casing and closed when received in said casing, means cooperating with said rod to maintain said arms in expanded position, and said plier constructed and adapted so that said rod is extended and said arms separated when said trigger is in the released position and said rod is retracted and said arms closed when said trigger is closed.

4. A safety-wiring plier comprising, in combination, an elongated casing, a rod slidably mounted in said casing and fixed therein to rotate therewith, a slot longitudinal of and in the rear portion of said rod, resilient means operatively connected to said rod and casing and urging said rod into extended position, means to limit the extension of said rod, a slot in said casing communicating with said slot in said rod, a trigger pivotally mounted on the rear end portion of said casing, a link pivotally secured in its outer end portion to said trigger intermediate the ends thereof, the other end portion of said link being received in said slot in said rod and said link operable to contact said rod to retract same upon closing said trigger, arms on the outer end portion of said rod, at least one of said arms pivotally secured to said rod and said arms having eyes in the outer end portions to receive safety wiring to twist same upon rotation of said casing and said rod in unison, said arm pivotally secured being pivoted inwardly upon retraction of said rod and in contact with said casing, and said plier being constructed and adapted so that when said trigger is in the released position said rod is extended and said arms are separated and when said trigger is in the closed position said rod is retracted and said arms closed.

5. Safety wiring pliers comprising, in combination, a casing, rod means mounted in said casing to be longitudinally movable therein and rotatable therewith, a slot in one end portion of said rod means, resilient means in said casing operatively connected to said rod means and said casing and urging said rod means into an extended position relative to said casing, a slot in said casing communicating with said slot in said rod means, trigger means pivotally mounted on said casing, means passing through said slots in said casing and said rod means and operatively connected to said trigger means and said rod means to retract said rod means upon closing of said trigger means and prevent rotation of said rod means relative to said casing, means on the other end portion of said rod means operable to receive safety wiring or the like to twist same upon rotation of said casing and said rod in unison, said pliers being constructed and adapted so that when said trigger means is in released position said rod means is extended by said resilient means and said means on said other end portion of said rod means is engageable with safety wiring or the like, said trigger means being movable to a closed position to retract said rod means and with said casing and said rod means being rotatable in unison to twist said wiring held by said means on said other end portion of said rod means.

References Cited in the file of this patent

UNITED STATES PATENTS

| | | |
|---|---|---|
| 302,924 | McMillen | Aug. 5, 1884 |
| 437,647 | Franklin | Sept. 30, 1890 |
| 582,293 | Koester | May 11, 1897 |
| 1,351,598 | Wise | Aug. 31, 1920 |
| 2,201,918 | Petersen | May 21, 1940 |
| 2,297,174 | Tabb et al. | Sept. 29, 1942 |
| 2,669,896 | Clough | Feb. 23, 1954 |